(12) United States Patent
Chronister et al.

(10) Patent No.: US 8,380,493 B2
(45) Date of Patent: Feb. 19, 2013

(54) ASSOCIATION OF SEMANTIC MEANING WITH DATA ELEMENTS USING DATA DEFINITION TAGS

(75) Inventors: Ben Chronister, Oakton, VA (US); Bryan Dove, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 161 days.

(21) Appl. No.: 12/895,870

(22) Filed: Oct. 1, 2010

(65) Prior Publication Data

US 2012/0084074 A1    Apr. 5, 2012

(51) Int. Cl.
   G06F 17/21    (2006.01)
(52) U.S. Cl. .............................. 704/10; 704/9
(58) Field of Classification Search .................. 704/9, 10
   See application file for complete search history.

(56) References Cited

U.S. PATENT DOCUMENTS

| | | | |
|---|---|---|---|
| 7,401,087 B2 * | 7/2008 | Copperman et al. | 707/737 |
| 7,657,555 B2 | 2/2010 | Rorex et al. | |
| 8,024,329 B1 * | 9/2011 | Rennison | 707/723 |
| 2006/0074832 A1 * | 4/2006 | Gardner et al. | 706/45 |
| 2007/0294614 A1 | 12/2007 | Jacquin et al. | |
| 2010/0023549 A1 | 1/2010 | Choi et al. | |
| 2011/0219028 A1 | 9/2011 | Dove et al. | |

OTHER PUBLICATIONS

Vargas-Vera, et al., "Knowledge Extraction by using an Ontology-based Annotation Tool", Retrieved at << http://citeseerx.ist.psu.edu/viewdoc/download?doi=10.1.1.107.5294&rep=rep1&type=pdf >>, In K-CAP workshop on Knowledge Markup and Semantic Annotation, 2001, pp. 8.

Danga, "Short description of the UN/EDIFACT message structure", Retrieved at << http://www.xaware.org/myblog/short-description-of-the-un-edifact-message-structure.html >>, Jun. 13, 2008, pp. 3.

Sheth, et al., "So Far (Schematically) yet So Near (Semantically)", Retrieved at << http://knoesis.wright.edu/library/download/41-sofar-sonear.pdf >>, Proceedings of the IFIP WG 2.6 Database Semantics Conference on Interoperable Database Systems, vol. A-25, Nov. 16-20, 1992, pp. 30.

Guarino, et al. "Ontological Analysis of Taxonomic Relationships", Retrieved at << http://www.cs.vassar.edu/~weltyc/papers/er2000/LADSEB05-2000.pdf >>, Proceedings of ER-2000: The International Conference on Conceptual Modeling, Oct. 2000 p. 1-15.

Kiu, et al., "Ontology Mapping and Merging through OntoDNA for Learning Object Reusability", Retrived at << file://ind-filvp01/Users/asisodia/Downloads/10.1.1.96.1681.pdf >>, Ontology Mapping and Merging through OntoDNA for Learning Object Reusability Educational Technology & Society, vol. 9, No. 3, Jul. 2006, pp. 27-42.

* cited by examiner

*Primary Examiner* — Jakieda Jackson

(57) ABSTRACT

Technology is described for associating semantic meaning with data elements. The system can include a messaging module configured to receive a message having data elements. A storage module can store the data elements from the message in a structured format. A message dictionary can be configured to identify a type of the message received and to lexically identify data elements of the message using the message dictionary and the type of message. In addition, a taxonomy module can be configured to provide a semantic meaning for the data elements of the lexically identified portions of the message. Further, a data definition tag repository can store data definition tags and link the message dictionary, the taxonomy, and storage location of the data elements in the storage module. The data definition tags can enable the semantic meaning of data elements to be queried.

20 Claims, 3 Drawing Sheets

ASSOCIATION OF SEMANTIC MEANING WITH DATA ELEMENTS USING DATA DEFINITION TAGS

BACKGROUND

Many computer processing and data storage systems receive a large volume of messages that are processed and stored in a database of information. Systems such as logistics management systems, manufacturing systems, retail systems, medical systems, and other data systems may receive thousands or millions of messages a day that need to be processed and stored in the processing and data storage system. For example, medical processing and data storage systems (e.g., Amalga Unified Intelligence System by Microsoft Corporation) may receive a large number of messages regarding patient transactions, patient procedures, medical test, various types of billing and a large number of other types of medical information.

Due the volume of data that is received and stored in many large data processing and data storage systems, there can be difficulties in querying the data because the system does not have a knowledge of the meaning of incoming data. A human may manually tag each data element with a semantic tag, and then manually create database query views that expose this data in the schema expected by the user application. However, this type of manual tagging and query generation is labor intensive and expensive in order to apply a semantic tag to the data elements.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various examples are described for associating semantic meaning with data elements. The system can include a messaging module configured to receive a message having data elements. The messaging module can infer the message dictionary associated with the message based on characteristics of the message. A message dictionary can be configured to identify a type of the message received and to lexically identify data elements of the message using the message dictionary and the type of message. A storage module can store the data elements from the message in a structured format. In addition, a taxonomy module can be configured to provide a semantic meaning for the data elements of the lexically identified portions of the message. Further, a data definition tag repository can store data definition tags and link the message dictionary, the taxonomy, and storage location of the data elements in the storage module. The data definition tags can enable the semantic meaning of data elements to be queried.

In an alternative embodiment, a method can be used for associating semantic meaning with data elements. The method can include the operation of receiving a message having data elements. The messages may be received over a computer network. Lexical divisions can be identified in the message using a message dictionary to identify a type of a message and expected locations of data elements in the message. A further operation can be providing a taxonomy that includes a semantic meaning for the data elements. The data elements can be stored in storage locations of a storage module in a structured format. Another operation is linking the storage locations of the data elements with the taxonomy and message dictionary using data definition tags in a data tag repository. This linking can enable data elements stored in the storage module to be queried based on semantic meanings of the data elements.

Being able to create semantic views enables end users to create powerful queries even though the end users may know very little about the underlying message structures or storage structures for the data elements. The end users can create queries of terms that are defined in the taxonomy module and then the queries will return information from the underlying storage system based on the linkage between the data definition tags and the location of the data elements.

DETAILED DESCRIPTION

Figure 1:
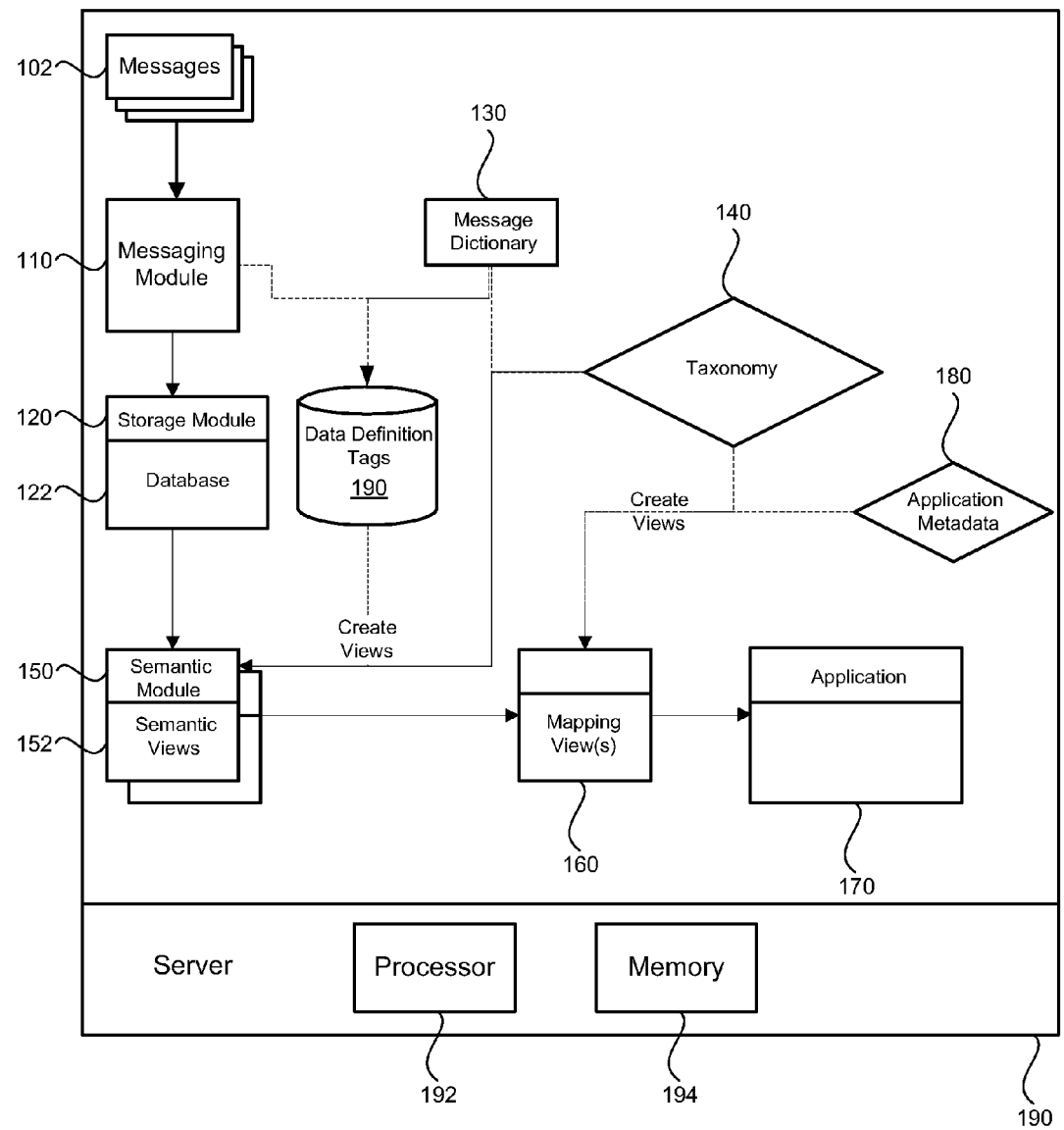
FIG. 1 is a block diagram illustrating an example of a system for associating semantic meaning with data elements.

Reference will now be made to the examples illustrated in the drawings, and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

When messages and/or data are received into a data processing and storage system, the data in messages typically does not have an attribute associated with the individual data elements. Even in the case where attributes may be provided, the attributes simply provide a category for the data and do not necessarily communicate anything about the meaning of the contents of the data element itself.

In situations where data is brought into a computer data processing and storage system, there is a desire to indicate meaning for message data elements so the data elements can be semantically found or queried by application extensions that desire to use the data elements. Since the system does not intrinsically know the meaning of incoming data, a human may manually tag each field with a semantic tag, and then manually create database query views that expose this data in the schema expected by the application extension. To avoid the labor intensive and expensive work associated with applying a semantic tag to the data elements, a technology can be provided for associating semantic meaning with data elements.

In one example of the technology, FIG. 1 illustrates that a system can be provided for associating semantic meaning with data elements that have been received. The system can include a messaging module 110 to receive a message 102 having data elements. The message may be received over a network connection and can have a pre-defined format. The pre-defined format type may be explicitly stated in the message or the pre-defined format type may be obtained by analyzing the message itself.

A message dictionary 130 can be used to identify a type of the message received and to lexically identify data elements of the message and the type of message. Each message type may have a corresponding message dictionary that is inferred based on characteristics of the message, and a message dictionary database can be stored in the message dictionary for each of a plurality of message types. When a message is received, then the message type can define the type of dictionary to be used. The message dictionary can used to identify the location of data elements within a message, and then message dictionary can apply an attribute name to data elements based on location.

A storage module 120 can be included to store the data elements in a structured format. The storage module may include computer software and/or computer hardware to store the data elements of the message(s). The computer software may include a database 122 such as a relational database with relational database tables having columns and rows for storing the data elements. Alternatively, databases such as object oriented databases, flat files, or other type of databases can be used to store the data elements. Various types of hardware can be used for the underlying physical storage for the databases and data elements in the data messages. For example, hard drives, optical drives, non-volatile computer memory (e.g. FlashRAM), or volatile computer memory can be used to store the data elements in the database.

A taxonomy module 140 can be configured to provide semantic meaning for the data elements in the lexically identified portions of the message. In order to give semantic meaning to the arbitrary data of the data elements, the taxonomy can include a list of entities representing known concepts and meanings associated with the entities, and this can be referred to as a taxonomy structure. For example, the taxonomy may contain an entity called "Patient Last Name" that defines a data element as containing the family name of a patient. In another example, the semantic term "narcotic drug" may be linked to a number of specific drug names in the taxonomy module. Each data element entering the system can be tagged as to its semantic meaning by referencing the list of concepts in the taxonomy. Thus, the specific location in the message that is identified by the message dictionary can be linked with at least one taxonomic concept. Alternatively, the content of a data element can be linked to taxonomy based on the word or value in the data element that matches to a specific term in the taxonomy.

An example of linking a taxonomy to a message dictionary may be provided by the intersection of multiple taxonomies. Specifically, referencing a Health Language 7 (HL7) dictionary can assist the system in identifying where a drug name and strength can be found in a message. The data elements representing the drug name and strength can also be referenced to the UMLS (Unified Medical Language System), so that drug name and strength for that individual record can be identified with a universally accessible code (namely an NDC11 or RXNORM code). The tag linkage uses the message dictionary and the taxonomy to provide the ability to automatically recognize the semantics of message content using a structural representation of a message dictionary, and the content's existence in known taxonomies or semantic ontologies. Then the appropriate information from the message dictionary and the taxonomy can be integrated to derive a data definition tag specific to that data or subset of data.

Each data element entering the system can be tagged so that the system knows the data element represents a specific entity in the taxonomy. The tagging provided can allow each data element to be located when needed, regardless of the underlying structural database schema or physical storage arrangement which is used to store the data element. The underlying storage structure in which data is stored can be arbitrary. For example, a storage schema may be used that is optimized for insert speed or a storage schema may match the messages' inherent data structure. A storage structure that matches the messages' structures can simplify the process of parsing the messages.

Tagging can be done automatically by creating a map that associates data definition tags with the locations that data elements are expected to appear in incoming messages. As a result, the data definition tag can include a storage location of the element, a reference to the taxonomic database, and a location of where the data was received in the incoming message. Accordingly, a data definition tag repository 190 can store data definition tags which link the message dictionary, the taxonomy, and storage location of the data elements in the storage module to enable the semantic meaning of data elements to be queried.

Another specific example of creating the data definition tags can be described. The message can be received into the system, and the system can identify through a series of tests which message dictionary to apply to the message. Once the message is identified as HL7 or another dictionary type, the field components that are defined in HL7 can be individually linked to known ontologies (i.e., taxonomies) representing the ontology for that specific content. When a given message comes through and after detecting the proper message dictionary and looking at the metadata of that message dictionary to find the associated ontologies for given fields within the message, the content of the fields in the given message can be indexed against the ontology to generate the data definition tags. As discussed, a data definition tag is an intersection of a given message field's content, a field's location in the message structure as defined by the message dictionary, and the field's relevance to the associated ontology.

Once incoming data is tagged, views can be created which aggregate data elements that are related semantically. A semantic view module 150 can be used to generate semantic views 152 of the data elements in terms of a taxonomy query or semantic query using the taxonomy module and data definition tags. Some data views can be created automatically which aggregate a set of specific data elements according to the definitions of a specific application, as specified by metadata associated with the application. For example, all demographic fields related to a patient may be added to a "Patient Current Demographics" view, even though the data elements may be present in multiple physical tables and retrieved from each of the tables in order to construct the view. In some configurations of the data view, the data elements may have a meaning in common or the data elements in a semantic view can share a common key, such as "Patient ID".

The taxonomy may include some core semantic entities common to each deployment of the data processing and storage system, as well as unique semantic entities used by specific applications. Since each deployment of a data processing and storage system may have a different set of applications installed, each deployment's taxonomy can contain the same core entities, and a different set of application specific taxonomy entities.

As additional applications 170 are created and installed into a specific deployment, new semantic entities can be merged into the deployment's shared taxonomy. The merged taxonomy can be used as a single reference index for the data elements present in the data processing and storage system. A namespace can be used to differentiate application specific entities and avoid naming conflicts. An example of an application specific entity is "Pulse Rate" which describes an observed metric related to a measured heart rate. This is in contrast to "Breathing Rate" which might be used by another application. Of course, arbitrary namespace identifiers can be used.

A specific application 170 may be used to query information about a defined data topic. One example may be a patient demographic view or a view of medical procedures a patient has undergone. An application can use specific views of data desired by end users.

A mapping view module 160 can generate a data view using application metadata 180 in conjunction with the taxonomy data. In a further configuration, the mapping view module can merge a plurality of taxonomies provided by a plurality of applications into a shared taxonomy.

These mapping views may use mapping data from multiple semantic views. As discussed, mapping views can be generated which combine data from multiple views. This mapping operation can use semantic views that have a semantic relationship with each other. The semantic relationship can be stored in the taxonomy database also. There are a large number of possible combinations between multiple semantic views, and the number of possible combinations may increase as the number of semantic views increases. Therefore, creating every possible desired combination of views ahead of time is not practical. An application that uses certain data can contain metadata describing the desired data's definitions and reference the taxonomy. The application metadata specifies certain data elements which should be placed into a mapping view. Such mapping views can be automatically created from the available semantic views.

An application metadata module 180 can provide information to create mapping views dynamically and to provide data to the application by combining multiple semantic views based on metadata associated with the application data specifications.

A server 190 with a processor 192 and a memory 194 can be used to process retrieval of data elements from the relational database. In addition, the server and processor can be used to execute the modules described above.

The taxonomy module 140 can create derived fields by referencing relationships specified between specific data fields using a taxonomy in the taxonomy module. Derived fields can be created automatically by specifying a formula or relationship between entities in the taxonomy. For example, there may be an entity in the taxonomy called "Admit Date" and another one called "Discharge Date", and there may be a derived field named "Length Of Stay" which is calculated by using date/time functions to measure the distance from the admission date to the discharge date from a medical facility. The derived view is added to a semantic view using the taxonomy module and can be used as though the actual data element were present. This allows computed data elements to be represented if there is another way of arriving at the information through a formula. These formulas can then be stored in the taxonomy database.

Figure 2:
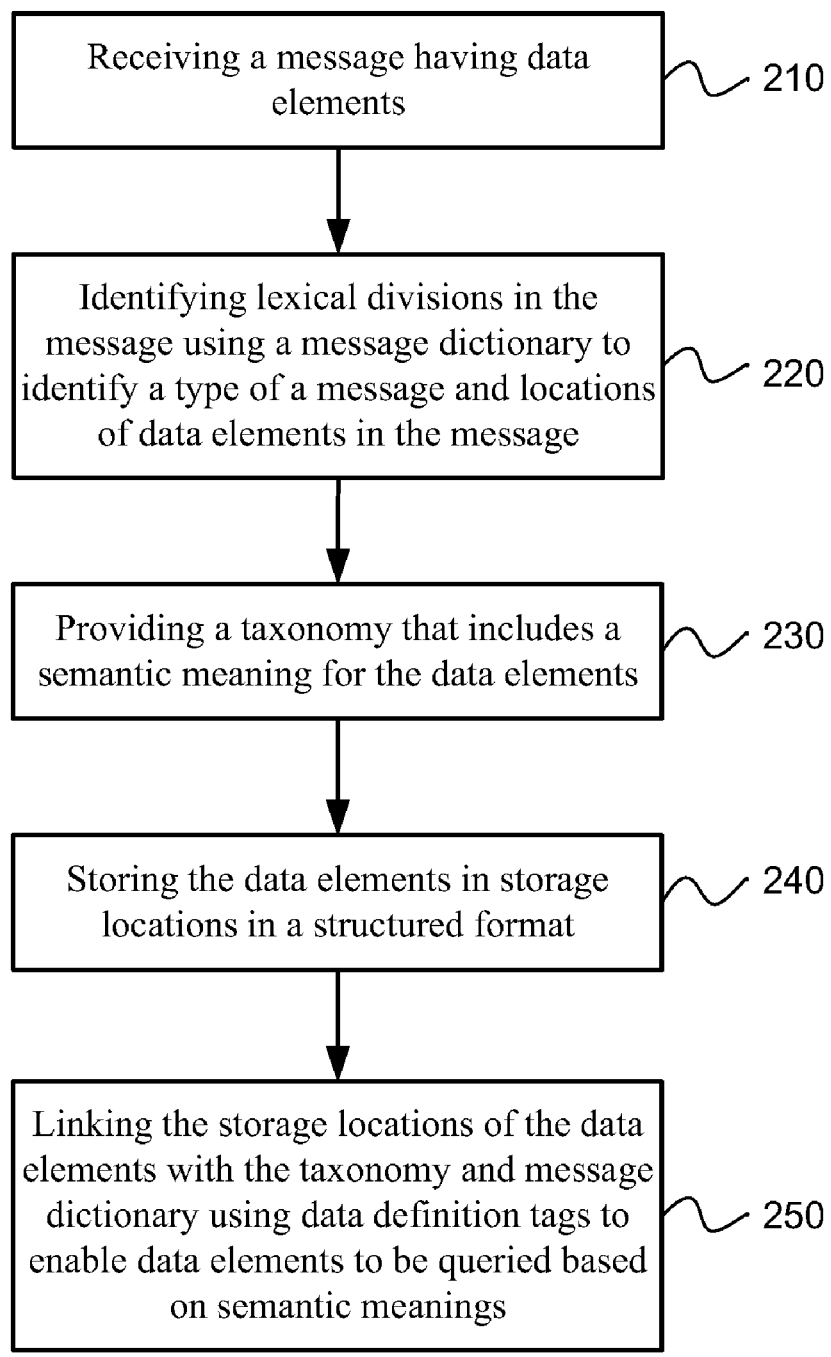
FIG. 2 is an example of a flowchart illustrating a method for associating semantic meaning with data elements.

Referring now to FIG. 2, an example method can be provided for associating semantic meaning with data elements. The method can include the operation of receiving a message having data elements, as in block 210. The associated message dictionary for the message can be inferred based on message characteristics. The lexical divisions in the message can be identified using a message dictionary to identify a type of a message and the expected location of data elements in the message, as in block 220. The lexical divisions can include finding a location for the beginning and end of data elements in the message, finding markers in the message and/or determining other structural or relationship identifiers for data elements in the message.

It is possible to automatically tag data elements based on the location in which the data elements occurred within a message by referencing the shared taxonomy to tag items and by using the location of data within the incoming message to determine the correct tag for the data element. This is possible whenever there is a dictionary available that describes the location of elements within messages. One such dictionary is the various HL7 (health level 7) standards for healthcare.

An additional example of using a data dictionary is where an XML document that has a known schema, such as a CCR (Continuity of Care Record) document, is received as a message. In the case of the XML document with the known schema, the dictionary to use may be specified in the header. In another example, a fixed width text file may be analyzed that can be interpreted by knowing the correct column widths (or some kind of template). There can be a dictionary available that defines those columns, along with names and data types, etc. This illustrates that a best fit dictionary can be selected from among several options by analyzing the message content.

A taxonomy can be provided that includes a semantic meaning for the data elements, as in block 230. The data linkage may begin by finding the locations of data elements as defined to appear in the message using the message dictionary. Once a data elements attribute has been assigned based on the location of the data elements, then taxonomic tags can be associated with the data elements as a result of knowing the data elements location in the message.

The data elements can be stored in storage locations of a storage module in a structured format, as in block 240. The storage locations of the data elements can be linked with the taxonomy and message dictionary using data definition tags in a data tag repository, as in block 250. This linkage can enable the data elements stored in the storage module to be queried based on semantic meanings of the data elements.

For example, if a medical user desires to query the cost of all types of endoscopic procedures that are available in the system, then a semantic query can be submitted to the system for that purpose. The taxonomic database can contain a listing of multiple types of procedures that are endoscopic in nature under the semantic category "endoscopic surgery." For example, the taxonomic database may include a listing of gastronomic, respiratory, urinary tract and a number of other types of endoscopic procedures in the semantic category. Thus, any cost data elements linked to these semantic subterms by the data definition tags can be retrieved directly from the data elements actual storage locations when the higher level semantic query is made for the cost of endoscopic procedures.

Instead of providing a one-time query to the system, a data view can be created and expressed in terms of a taxonomy query using a semantic view module. As in the example above, an endoscopic procedure cost data view can be stored and then accessed by an application as requested by the integrated application. In other words, an integrated application can be used to query information about a semantic data topic using the taxonomy.

Sometimes a combination of data views is desirable. As a result, mapping views can be created dynamically using a mapping view module by combining multiple semantic views based on metadata associated with the application's specified data needs.

As discussed previously, a plurality of taxonomies provided by a plurality of applications can be merged into a shared taxonomy. These taxonomies can include derived fields that are generated by referencing relationships specified between specific data elements using the taxonomy.

Figure 3:
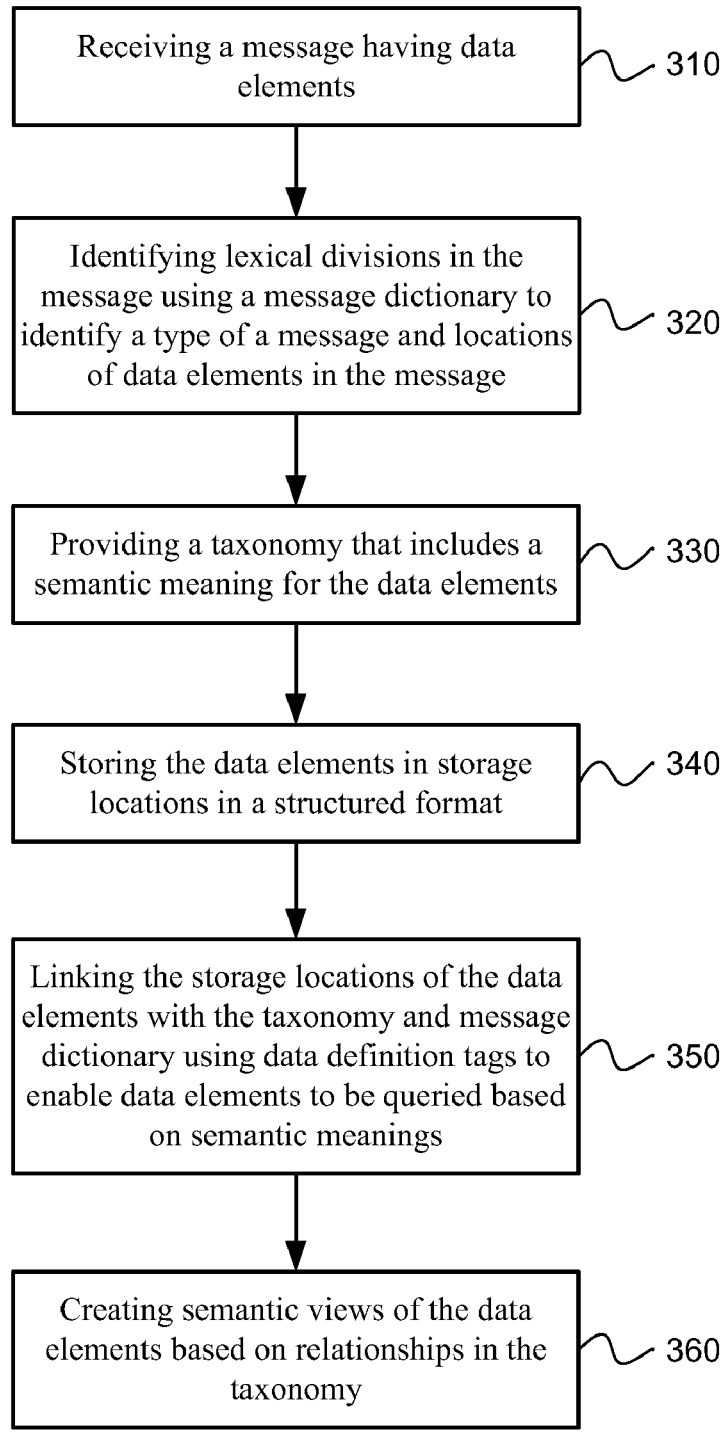
FIG. 3 is a flowchart illustrating an example of a method for associating semantic meaning with data elements and the creation of semantic view.

Referring now to FIG. 3, another example method is provided for associating semantic meaning with data elements. FIG. 3 illustrates that operations of this method shown in block 310-350 are similar to the operations in blocks 210-250 in FIG. 2 and will not be discussed in detail again here. However, the method illustrated in FIG. 3 includes the operation of creating semantic views of the data elements based on relationships in the taxonomy, as in block 360. Being able to create semantic views enables end users to create powerful queries even though the end users may know little about the underlying message structures or storage structures for the data elements. The end users can create queries of terms that are defined in the taxonomy module and then the queries will return information from the underlying storage system based on the linkage between the data definition tags and the location of the data elements.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A system for associating semantic meanings with data elements, comprising:
   a processor; and
   memory storing:
      a message dictionary for each of a plurality of message types, each message dictionary for a message type defining locations of data elements within messages of the message type;
      a messaging module configured to receive a message having data elements and to associate a message dictionary with the message based on characteristics of the message, wherein the message dictionary associated with the message is configured to identify a message type of the message and to identify lexical portions of the message;
      a taxonomy module configured to provide a taxonomy that includes taxonomic concepts and semantic meanings associated with the taxonomic concepts and to automatically tag data elements in the lexical portions of the message based on locations in which the data elements occurred within the message by:
         referencing the taxonomy for taxonomic concepts that provide semantic meanings for the data elements in the lexical portions of the message,
         linking the taxonomic concepts to locations in the message defined by the message dictionary associated with the message,
         storing the data elements of the message in storage locations of a storage module in a structured format, and
         associating data definition tags with the data elements of the message, each data definition tag for a data element of the message linking a storage location of the message in the storage module with a taxonomic concept of the taxonomy and a location of the data element in the message defined by the message dictionary associated with the message; and
      a data definition tag repository configured to store the data definition tags and to enable the data elements stored in the storage module to be queried based on the semantic meanings for the data elements provided by the taxonomic concepts.

2. The system as in claim 1, further comprising a semantic view module configured to generate semantic views of the data elements stored in the storage module in response to a semantic query using the taxonomy and the data definition tags.

3. The system as in claim 1, further comprising a mapping view module configured to generate a combined semantic view of data elements stored in the storage module from multiple semantic views of the data elements.

4. The system as in claim 3, further comprising an application metadata module configured to provide information to the mapping view module and to provide a combined semantic view of the data elements to an application based on metadata associated with the application.

5. The system as in claim 1, further comprising an integrated application used to query information about a semantic data topic using the taxonomy.

6. The system as in claim 1, wherein:
the taxonomy comprises a shared taxonomy used as single reference index for data elements present in a data processing and storage system,
the shared taxonomy is created by merging a plurality of taxonomies provided by a plurality of applications installed by the data processing and storage system, and
the shared taxonomy includes core semantic entities common to the plurality of applications and application specific semantic entities.

7. The system as in claim 1, wherein the storage module comprises a relational database for storing data elements in relational tables.

8. The system as in claim 1, wherein the message specifies the message dictionary associated with the message.

9. The system as in claim 1, wherein the taxonomy module is configured to create derived fields by referencing relationships specified between specific data fields using the taxonomy.

10. A method for associating semantic meanings with data elements, comprising:
providing a taxonomy that includes taxonomic concepts and semantic meanings associated with the taxonomic concepts;
providing a message dictionary for each of a plurality of message types, each message dictionary for a message type defining locations of data elements within messages of the message type;
receiving a message having data elements;
associating a message dictionary with the message based on characteristics of the message;
identifying a message type of the message and lexical portions of the message using the message dictionary associated with the message;
automatically tagging data elements in the lexical portions of the message based on locations in which the data elements occurred within the message by:
referencing the taxonomy for taxonomic concepts that provide semantic meanings for data elements in the lexical portions of the message,
linking the taxonomic concepts to locations in the message defined by the message dictionary associated with the message,
storing the data elements of the message in storage locations of a storage module in a structured format, and
associating data definition tags with the data elements of the message, each data definition tag for a data element of the message linking a storage location of the data element in the storage module with a taxonomic concept of the taxonomy and a location of the data element in the message defined by the message dictionary associated with the message; and
storing the data definition tags in a data definition tag repository to enable the data elements stored in the storage module to be queried based on the semantic meanings for the data elements provided by the taxonomic concepts.

11. The method as in claim 10, further comprising generating a data view of data elements stored in the storage module in response to a semantic query using the taxonomy and the data definition tags.

12. The methods as in claim 10, wherein the message specifies the message dictionary associated with the message.

13. The method as in claim 10, further comprising providing a data view of data elements stored in the storage module to an application in a mapping view created by combining multiple semantic views based on application metadata associated with the application.

14. The method as in claim 10, wherein:
the taxonomy comprises a shared taxonomy used as single reference index for data elements present in a data processing and storage system,
the shared taxonomy is created by merging a plurality of taxonomies provided by a plurality of applications installed by the data processing and storage system, and
the shared taxonomy includes core semantic entities common to the plurality of applications and application specific semantic entities.

15. The method as in claim 10, further comprising creating derived fields by referencing relationships specified between specific data elements using the taxonomy.

16. The system as in claim 10, further comprising creating semantic views of the data elements stored in the storage module based on taxonomy queries.

17. A memory device storing computer instructions that, when executed, cause a computer to perform a method for associating semantic meanings with data elements, the method comprising:
providing a taxonomy that includes taxonomic concepts and semantic meanings associated with the taxonomic concepts;
providing a message dictionary for each of a plurality of message types, each message dictionary for a message type defining locations of data elements within messages of the message type;
receiving a message having data elements;
associating a message dictionary with the message based on characteristics of the message;
identifying a message type of the message and lexical portions of the message using the message dictionary associated with the message;
automatically tagging data elements in the lexical portions of the message based on locations in which the data elements occurred within the message by:
referencing the taxonomy for taxonomic concepts that provide semantic meanings for data elements in the lexical portions of the message,
linking the taxonomic concepts to locations in the message defined by the message dictionary associated with the message,
storing the data elements of the message in storage locations of a storage module in a structured format, and
associating data definition tags with the data elements of the message, each data definition tag for a data element of the message linking a storage location of the data element in the storage module with a taxonomic concept of the taxonomy and a location of the data element in the message defined by the message dictionary associated with the message;
storing the data definition tags in a data definition tag repository to enable the data elements stored in the storage module to be queried based on the semantic meanings for the data elements provided by the taxonomic concepts; and
creating semantic views of the data elements stored in the storage module using the taxonomy and the data definition tags.

18. The memory device of claim 17, wherein:
the taxonomy comprises a shared taxonomy used as single reference index for data elements present in a data processing and storage system, the shared taxonomy is created by merging a plurality of taxonomies provided by a plurality of applications installed by the data processing and storage system, and the shared taxonomy includes core semantic entities common to the plurality of applications and application specific semantic entities.

19. The memory device of claim 18, further storing computer instructions for providing a semantic view of data elements stored in the storage module based on application metadata associated with an application of the plurality of applications.

20. The memory device of claim 19, wherein the semantic view is a mapping view created by combing multiple semantic views of the data elements.

* * * * *